(12) United States Patent
Boyle et al.

(10) Patent No.: US 7,408,925 B1
(45) Date of Patent: Aug. 5, 2008

(54) ORIGINATOR BASED DIRECTING AND ORIGINATION CALL PROCESSING FEATURES FOR EXTERNAL DEVICES

(75) Inventors: Frank J. Boyle, Broomfield, CO (US); Kurt H. Haserodt, Westminster, CO (US); Peter Andrew Mataga, Sparta, NJ (US); Chandra M. Ravipati, Thornton, CO (US); Ryan Scott Wallach, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 787 days.

(21) Appl. No.: 10/846,984

(22) Filed: May 14, 2004

Related U.S. Application Data

(60) Provisional application No. 60/558,404, filed on Mar. 31, 2004.

(51) Int. Cl.
H04L 12/28 (2006.01)
H04L 12/66 (2006.01)
H04M 3/42 (2006.01)
G06F 15/16 (2006.01)

(52) U.S. Cl. .................. 370/352; 370/395.2; 370/401; 370/410; 379/201.01; 709/203; 709/227

(58) Field of Classification Search .............. 370/352, 370/395.2, 401, 410; 379/201.1; 709/203, 709/227
See application file for complete search history.

(56) References Cited

U.S. PATENT DOCUMENTS 4,086,438 A 4/1978 Kahn et al.
4,277,649 A 7/1981 Sheinbein
4,918,721 A 4/1990 Hashimoto
5,206,903 A 4/1993 Kohler et al.
5,247,571 A 9/1993 Kay et al.
5,339,356 A 8/1994 Ishii (Continued)

FOREIGN PATENT DOCUMENTS

EP 0 980 176 2/2000

(Continued)

OTHER PUBLICATIONS

U.S. Appl. No. 10/370,845, filed Feb. 21, 2003, Boyle et al.

(Continued)

*Primary Examiner*—Alpus H Hsu
(74) *Attorney, Agent, or Firm*—Sheridan Ross P.C.

(57) ABSTRACT

The present invention is directed to an architecture 200 for setting up a communication between first and second communication devices 216 and 220, the first communication device 216 corresponding to a first directing server 224 and first communication manager 204 separate from the first directing server 224, comprising a contact servicing agent 244 operable to (a) receive a call set up message at least one of addressed to and originated by the first communication device 216; (b) determine that the first communication device 216 has a corresponding first communication manager 204; (c) forward the call set up message to the first communication manager 204 and request the first communication manager 204 to perform at least one of call originating and terminating processing; and (d) rout the call set up message to a destination referenced in the call set up message.

23 Claims, 5 Drawing Sheets

U.S. PATENT DOCUMENTS

| | | | |
|---|---|---|---|
| 5,386,459 A | 1/1995 | Veeneman et al. | |
| 5,404,395 A | 4/1995 | Bogart et al. | 379/201 |
| 5,425,077 A | 6/1995 | Tsoi | |
| 5,452,347 A | 9/1995 | Iglehart et al. | |
| 5,572,572 A | 11/1996 | Kawan et al. | |
| 5,577,110 A | 11/1996 | Aquino | |
| 5,615,257 A | 3/1997 | Pezzullo et al. | |
| 5,659,603 A | 8/1997 | Orlofsky | |
| 5,790,646 A | 8/1998 | Moon | |
| 5,794,156 A | 8/1998 | Alanara | |
| 5,828,747 A | 10/1998 | Fisher et al. | |
| 5,905,793 A | 5/1999 | Flockhart et al. | |
| 5,956,655 A | 9/1999 | Suzuki et al. | |
| 5,982,873 A | 11/1999 | Flockhart et al. | |
| 5,999,827 A | 12/1999 | Sudo et al. | |
| 6,038,302 A | 3/2000 | Burok et al. | |
| 6,044,403 A | 3/2000 | Gerszberg et al. | |
| 6,163,607 A | 12/2000 | Bogart et al. | |
| 6,169,797 B1 | 1/2001 | Wildgrube et al. | |
| 6,173,053 B1 | 1/2001 | Bogart et al. | |
| 6,192,122 B1 | 2/2001 | Flockhart et al. | |
| 6,203,192 B1 | 3/2001 | Fortman | |
| 6,204,848 B1 | 3/2001 | Nowlan et al. | |
| 6,215,474 B1 | 4/2001 | Shah | |
| 6,246,983 B1 | 6/2001 | Zou et al. | |
| 6,434,226 B1 * | 8/2002 | Takahashi | 379/201.01 |
| 6,463,304 B2 | 10/2002 | Smethers | |
| 6,516,061 B2 | 2/2003 | Horowitz et al. | |
| 6,546,004 B2 | 4/2003 | Gullicksen | |
| 6,546,239 B1 | 4/2003 | Pazdersky et al. | |
| 6,554,707 B1 | 4/2003 | Sinclair et al. | |
| 6,567,075 B1 | 5/2003 | Baker et al. | |
| 6,625,141 B1 * | 9/2003 | Glitho et al. | 370/352 |
| 6,665,723 B2 * | 12/2003 | Trossen | 709/227 |
| 6,668,173 B2 | 12/2003 | Greene | |
| 6,754,314 B2 | 6/2004 | Wengrovitz et al. | |
| 6,788,676 B2 * | 9/2004 | Partanen et al. | 370/352 |
| 6,798,767 B1 | 9/2004 | Alexander et al. | |
| 6,823,197 B1 | 11/2004 | Chen et al. | |
| 6,920,339 B1 | 7/2005 | Choy et al. | |
| 6,937,597 B1 * | 8/2005 | Rosenberg et al. | 370/356 |
| 6,944,150 B1 * | 9/2005 | McConnell et al. | 370/352 |
| 6,950,441 B1 * | 9/2005 | Kaczmarczyk et al. | 370/467 |
| 6,990,353 B2 | 1/2006 | Florkey et al. | |
| 6,996,076 B1 * | 2/2006 | Forbes et al. | 370/310 |
| 7,031,443 B2 | 4/2006 | St-Onge et al. | |
| 7,120,243 B2 | 10/2006 | Milton | |
| 7,149,506 B2 * | 12/2006 | Osterhout et al. | 455/417 |
| 7,197,124 B2 | 3/2007 | Hutchinson, IV | |
| 7,218,722 B1 * | 5/2007 | Turner et al. | 379/221.02 |
| 7,242,680 B2 | 7/2007 | Gallant | |
| 7,257,201 B2 * | 8/2007 | Singh et al. | 379/88.13 |
| 2002/0122547 A1 | 9/2002 | Hinchey et al. | |
| 2002/0137490 A1 | 9/2002 | Gallant | |
| 2003/0016810 A1 | 1/2003 | Milton | 379/242 |
| 2003/0016811 A1 | 1/2003 | Milton | 379/245 |
| 2003/0231748 A1 | 12/2003 | Novelline | |
| 2005/0013421 A1 | 1/2005 | Chavez | |
| 2005/0027867 A1 * | 2/2005 | Mueller et al. | 709/227 |
| 2005/0144008 A1 | 6/2005 | Groves et al. | |

FOREIGN PATENT DOCUMENTS

| | | |
|---|---|---|
| EP | 1037451 | 9/2000 |
| JP | 05-260176 | 10/1993 |
| JP | 09-135320 | 5/1997 |
| JP | 2002-084370 | 3/2002 |
| JP | 2002-259300 | 9/2002 |
| WO | WO 01/35615 | 5/2001 |

OTHER PUBLICATIONS

Avaya Inc.'s "Multivantage™ Software: Product Summary" at http://www.avaya.com/ac/common/index.jhtml?location=M1H1005G1002F2013P3042N4292 (printed Nov. 2, 2002).

Avaya Inc.'s "EC500 Key Features" at http://www.avaya.com/ac/common/index.jhtml?location=M1H1005G1015F2062P3142N4988 (printed Nov. 20, 2002).

Avaya Inc.'s "EC500: Product Summary" at http://www.avaya.com/ac/common/index.jhtml?location=M1H1005G1015F2062P3142N4986 (printed Nov. 20, 2002).

Product Brochure, "Avaya Converged Communications Server," (2004), 6 pages.

"Avaya Announces New Enterprise Class IP Solutions (ECLIPS)" *Communication without Boundaries* (2002).

Avaya Communications, "EC500 Extension to Cellular, Release 2, User's Guide," Issue 1 (Jul. 2001).

Avaya, "EC500 Extension to Cellular, Release 3, User's Guide," Issue 2 (Jan. 2002).

Avaya, "EC500 Extension to Cellular, Release 3 and Release 4, User's Guide," Issue 3 (Aug. 2002).

Avaya, "EC500 Extension to Cellular, Release 4, User's Guide," Issue 4 (Aug. 2002).

"IP LAN Telephony: the Technology Migration Imperative" Avaya Executive Briefing Paper (Feb. 2002), pp. 1-21.

Chavez, David et al., "Avaya MultiVantage™ Software: Adapting Proven Call Processing for the Transition to Converged IP Networks," *Communication without Boundaries* (Aug. 2002).

Greenfield, David; "Avaya's SIP-Standardized IP Telephony" *Network Magazine* (Mar. 15, 2004), available at http://www.networkmagazine/shared/article/showArticle.jhtml?articleId=18200469, 2 pages.

"SIP (Session Initiation Protocol) in Enterprise-Class IP Telephony Networks," *Communication without Boundaries* (2002).

3GPP Specifications: Plenary Meeting Details (printed Mar. 30, 2004) available at http://www.3gpp.org/ftp/Specs/html-info/PlenaryMeetings.htm, 44 pages.

Kiss, Krisztian, "Signalling flows for the IP multimedia call control based on Session Initiation Protocol (SIP) and Session Description Protocol (SDP); Stage 3" 3GPP TS Specification: 24.228 (printed Mar. 30, 2004) available at http://www.3gpp.org/ftp/Specs/html-info/24228.html, 2 pages.

Drage, Keith, "Internet Protocol (IP) multimedia call control protocol based on Session Initiation Protocol (SIP) and Session Description Protocol (SDP); Stage 3" 3GPP TS Specification: 24.229 (printed Mar. 30, 2004) available at http://www.3gpp.org/ftp/Specs/html-info/24229.htm, 2 pages.

Segev, Uri, "AD405 SIP—What Can you Do With It?" IMB The Workplace for Innovation, Lotus Software, (undated) 49 pages.

Lektenius, Johan, "ISN Major Project," University of Technology, Sydney, Faculty of Engineering (2002), 30 pages.

Aim Wireless, "Learn How to Type Using Your Phone," Mar. 13, 2003, available at http://www.aim.com/wireless/typing_messages.htm, 3 pages.

Definity. RTM., Enterprise Communicatins Server, Release 6, Administration and Feature Description, "Terminal Translation Initialization," pp. 4-562 to 4-569, Aug. 19907.

Definity.RTM., Enterprise Communications Server, Release 6, Administration and Feature Description, "Bridged Call Appearance," pp. 4-109 to 4-124, Aug. 1997.

Lucent Technologies, "6408+, 6408D+, 6416D+M, 6424D+, and 6424D+M Telephones User's Guide," Issue 3, Apr. 1999, pp. 1-28.

* cited by examiner

ORIGINATOR BASED DIRECTING AND ORIGINATION CALL PROCESSING FEATURES FOR EXTERNAL DEVICES

CROSS REFERENCE TO RELATED APPLICATIONS

This application claims the benefits under 35 U.S.C. § 119 of U.S. Provisional Patent Application Ser. No. 60/558,404, filed Mar. 31, 2004, of the same title and to the same inventors, and cross reference is made to copending U.S. application Ser. No. 10/370,845, filed Feb. 21, 2003, entitled "Subscriber Mobility in Telephony Systems", to Boyle et al., which contains subject matter related to the present invention, each of which is incorporated herein by this reference.

FIELD OF THE INVENTION

The present invention relates generally to communication systems and specifically to packet-switched telecommunication systems.

BACKGROUND OF THE INVENTION

Packet-switched voice communications are rapidly displacing conventional circuit-switched voice communications as the preferred mode of communicating in real time between individuals. As a result, various telecommunications protocols, such as the Session Initiation Protocol or SIP and H.323, have been developed to provide computer telephony applications with the features normally present in circuit-switched telephony, such as call forwarding, callee and caller number delivery, personal mobility, terminal-type negotiation and selection, terminal capability negotiation, caller and callee authentication, blind and supervised call transfer, and conferencing.

To converge circuit-switched and packet-switched communications into a single architecture, many manufacturers are using standalone server architectures, also called decomposed server architectures. An example of a decomposed server architecture in an enterprise network is presented in FIG. 1. The architecture 100 includes the enterprise network 102, home proxy servers 104 and 108 in communication with corresponding packet switched communication devices 112 and 116, respectively, and communication managers 120 and 124 serving the communication devices 112 and 116, respectively. An edge proxy server 136 interfaces the enterprise network with an external data network (not shown), such as the Internet. As will be appreciated, the proxy servers effect call directing and session management, redirect functions, directing to media gateways, and user authentication, maintain a map of what IP address a given user has at a selected time, and maintain user profiles and provide subscriber registration; and the communication manager provides, inter alia, call origination and termination services. Each communication device has an extension administered on its corresponding communication manager and a user administered on its corresponding home proxy server.

The decomposed server architecture 100 can fail to provide call origination services in many applications. By way of example, if the communication device 112 makes a call to the communication device 116 using a SIP INVITE message, the message is received by the home proxy server 104 and is forwarded to the edge proxy server 136 and then to the home proxy server 108 of the called communication device 116 due to the use of destination directing. The communication manager 120 of the calling communication device 112 and the communication manager 124 of the called communication device 116 do not receive the INVITE message and therefore are unaware that the call has been made/received. Thus, call origination features will not be activated; that is, call appearances and bridged call appearances will not be illuminated, and class of service and class of restrictions will not be applied. The same problem exists when the communication device 112 calls a device outside of the domain of the home proxy server 104, when digit-dialed calls are directed to a communication manager user within the enterprise network domain but not within the domain of the same communication manager, and communication devices with a contact on a communication manager other than the originator's communication manager.

SUMMARY OF THE INVENTION

These and other needs are addressed by the various embodiments and configurations of the present invention. The present invention is directed to a method and architecture for directing a call set up message to a communication manager for call origination processing and to a destination communication device.

In a first embodiment, the present invention is directed to a method including the steps of:

(a) a first directing server receiving a call set up message addressed to and/or originated by the first communication device;

(b) the first directing server determining that the first communication device has a corresponding first communication manager;

(c) the first directing server forwarding the call set up message to the first communication manager and requesting the first communication manager to perform call processing;

(d) the first communication manager performing the call processing; and (e) the first directing server directing the call set up message to a destination referenced in the call set up message. As used herein, a "directing server" refers to a computational component that directs or forwards messages to a destination, such as a gatekeeper, a proxy server, tandem node (ISDN), and transit nodes (QSIG) and a communication manager to a computational component that provides or enables telephony features to subscribers, such as a Private Branch Exchange.

The first directing server determines whether the first communication device has a corresponding first communication manager typically by mapping an identity (e.g., an electronic address such as a URI on an enterprise network) to a set of administered extensions to identify the administered extension corresponding to the first communication device. When a communication device has a corresponding communication manager, the directing server typically inserts the identity of the communication device in the call set up message and includes a first (or call originating) indicator in the call set up message to indicate that call originating processing is to be performed.

When the communication manager receives the call set up message, the communication manager typically maps the identity of the first communication device against a set of administered extensions to determine the administered extension for the first communication device and, when the mapping operation is successful, performs the call processing operation. When the call originating processing is completed, the communication manager can include a second (or call terminating) indicator in a responsive message returned to the first directing server to indicate that call terminating processing is to be performed. When the call set up message (which includes the second indicator) is forwarded to the called destination, the directing server associated with the called destination can direct the call set up message to the appropriate communication manager for call terminating processing to be performed.

When the call processing is call originating processing, the call originating processing typically includes the application of a call originating feature, such as bridging, hold recall, transfer recall, intercom, call pickup, line appearance reservation, call appearance lamp updates, class of restriction, call detail recording, one-touch recording on originated calls, access to feature name Universal Resource Indicators or URIs, and use of an administered communication manager's dial plan for all calls.

Many originating features are not invoked automatically for a call but must be indicated by the originator as part of the call setup message, e.g., within the Request-URI of a SIP INVITE; that is, it is invoked by making use of a Feature Name URI. For feature name URIs, the application is activation and/or deactivation of a feature defined by the feature name URI. Feature activation/deactivation may apply globally to an existing call in progress for the originating user or applied to a call being currently set up. Examples of such features include: activate appearance select, automatic callback cancel, call forward all, call forward busy/no answer, call forward cancel, call park, call park answer back, call pick-up, conference on answer, calling number block, calling number unblock, directed call pick-up, drop last added party, exclusion, held appearance select, idle appearance select, last number dialed, malicious call trace, malicious call trace cancel, off-PBX call enable, off-PBX call disable, priority call, send all calls, send all calls cancel, transfer on hang-up, intercom, one-touch recording, and transfer to voice mail.

The present invention can have advantages over the prior art. For example, the present invention can ensure that a decomposed server architecture will provide call origination and termination services. The present invention accomplishes this by performing originator-based directing at the directing server. The present invention can allow for user mobility so that a user can receive call processing services when their local outbound directing server is not their home directing server.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Decomposed Server Architecture

Figure 2:
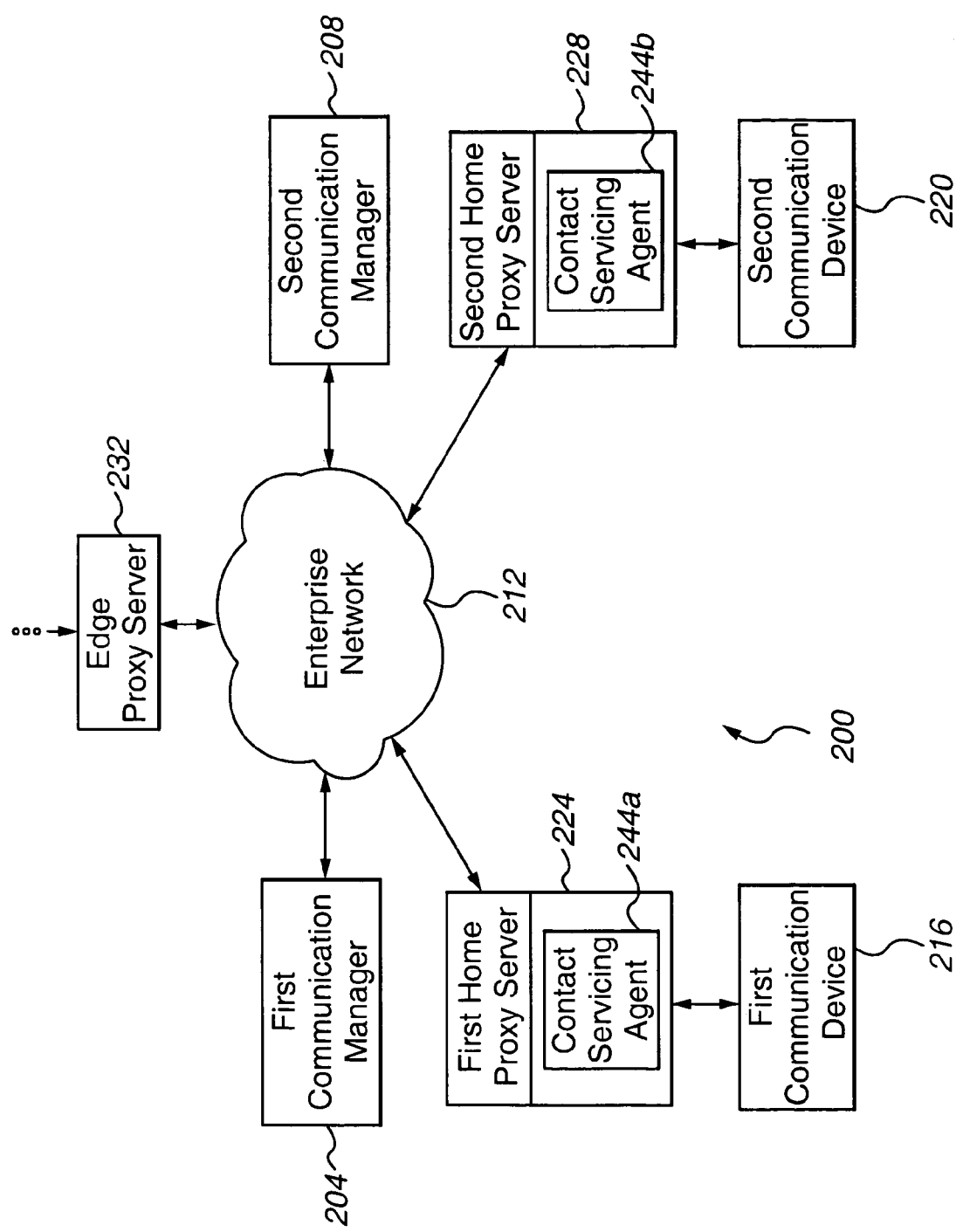
FIG. 2 is an enterprise network architecture according to an embodiment of the present invention.

FIG. 2 depicts a communications network according to a first embodiment of the present invention. The network architecture 200, which is depicted as an enterprise network, comprises first and second communication managers 204 and 208 for directing and processing incoming and outgoing contacts, a packet-switched network 212, first and second packet-switched network communication devices 216 and 220 being serviced by the first and second communication managers respectively, first and second home proxy servers 224 and 228 servicing the first and second communication devices 216 and 220 respectively, and an edge proxy server 232, in communication with the packet-switched network 212. The first and second communication managers 204 and 208 can be connected to the Public Switched Telephone Network or PSTN, and the edge proxy 232 can be connected to a packet-switched data network, such as the Internet. As will be appreciated, the various servers and communication managers can be implemented in software and/or hardware, depending on the application, and can be combined or distributed as shown.

Figure 1:
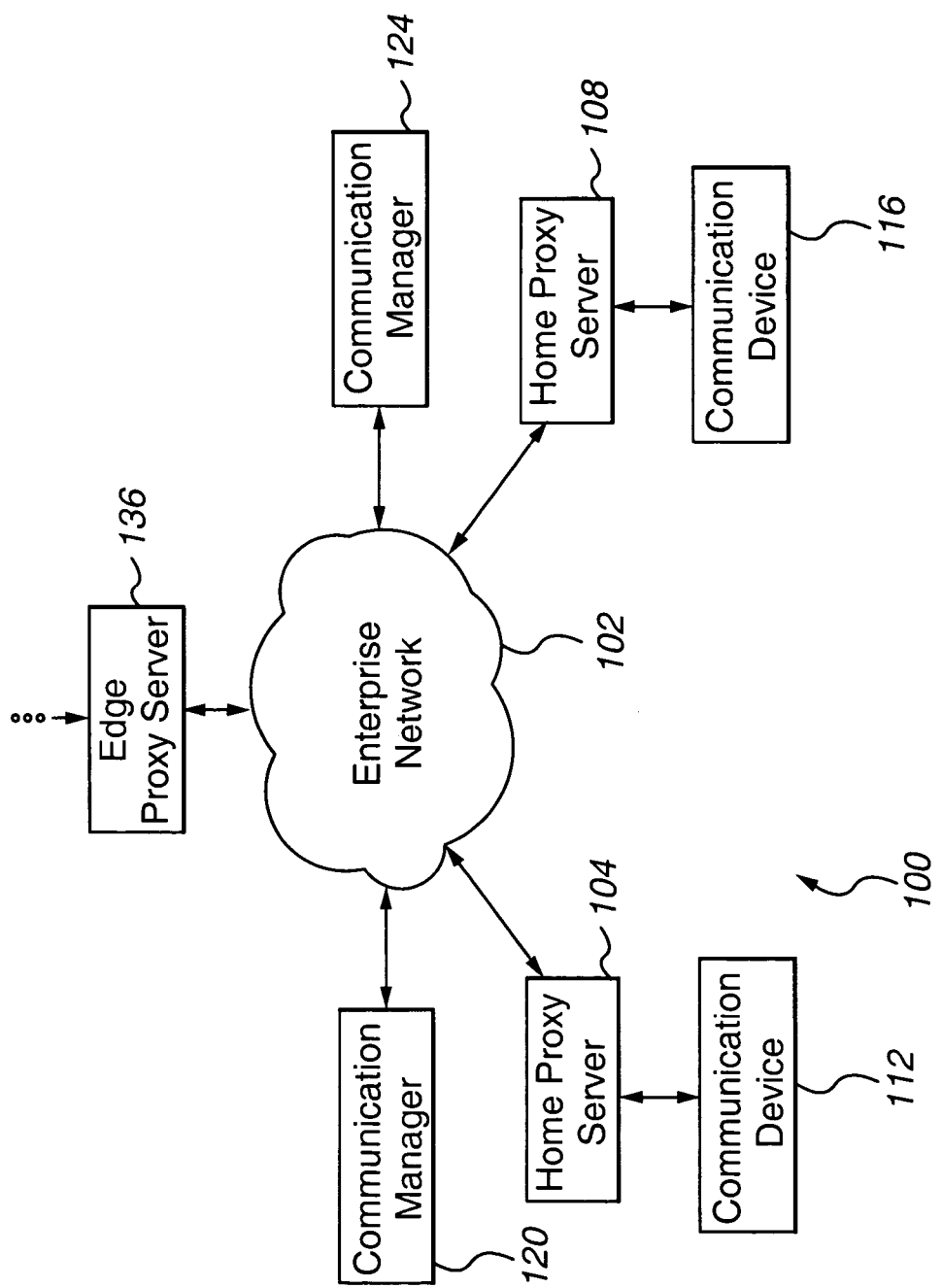
FIG. 1 is a prior art enterprise network architecture.

The communication managers 204 and 208 can be any architecture for directing contacts to one or more communication devices. Illustratively, the communication managers of FIG. 1 can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ private-branch exchange (PBX)-based ACD system; Avaya Inc.'s MultiVantage™ PBX, Avaya, Inc.'s S8300™ or S8700™ media server, Avaya Inc.'s Interaction Center™, or Avaya Inc.'s Call Manager™, with a modified form of the Call Manager™ being particularly preferred. The communication manager typically is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The communication manager comprises a network interface card (not shown) to provide call origination and termination services to the communication devices. Included in the memory is a contact controller for handling incoming and outgoing contacts, and a media gateway for signal conversion from packet-switched to circuit-switched and vice versa. Exemplary media gateways include Avaya, Inc.'s, G700 Media Gateway™ and may be implemented as hardware such as via an adjunct processor or chip in the switch/server.

The packet-switched enterprise network 212 can be any data and/or distributed processing network, such as the Internet. Although the network is depicted as an enterprise network, it is to be understood that the network can be any distributed processing network, such as a Wide Area Network, a Metropolitan Area Network, and the like. The network can include additional components, such as proxies, presence servers, redirect servers, registrars, and routers for managing packet flows. In one alternative configuration, the network is a packet-switched or circuit-switched wireless network.

The first and second communication devices 216 and 220 can be any communication device suitable for a packet-switched network and can include, for example, IP hardphones such as the Avaya, Inc.'s, 4600 Series IP Phones™, IP softphones such as Avaya, Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and packet-based loudspeaker paging and announcement units.

The proxy servers 224, 228, and 232 are responsible for contact directing and session management. They can also perform redirect functions, directing to media gateways, user authentication, maintenance of a map of what IP address a given user has at a selected time and maintains user profiles, and provide subscriber registration information. Before directing a session to its addressee, the proxy server queries one or more of a domain name server, the presence server, or other location server. The proxy servers can be any modified proxy server, such as a modified Avaya Inc.'s Converged Communications Server™ or CCS™ or Avaya Inc.'s EC500™ running on a server, such as Avaya Inc.'s S8700™ server.

In a preferred configuration, the communication managers 204 and 208, network 212, first and second communication devices 216 and 220, and proxy servers 224, 228 and 232 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

Included within the memory of each of the first and second proxy servers 224 and 228 is a contact servicing agent 244a and 244b, respectively. The agents 244a,b are aware of the corresponding communication manager and ensure that the pertinent communication manager will apply call origination/termination processing before the message is routed to the destination or called party.

To demonstrate the operation of the agents, an example will be discussed assuming the first communication device 216 initiates a call to the second communication device 220. When the call setup message is received by the agent 244a, the agent, based on the originating user identification information (e.g., electronic address of the first communication device 216), determines if the originating user has a corresponding communication manager. Because the originator is serviced by the first communication manager 204, the message is forwarded to the first communication manager 204 for call origination processing. The message is typically routed back to the proxy server 224 with an indication that the origination processing has been performed. The proxy server 224 then routes the message to the second communication device 220. When the message is received by the second proxy server 228, the agent 244b determines, based on the destination user identification information (e.g., electronic address of the second communication device 220), whether the called party has a corresponding communication manager. Because the called party is serviced by the second communication manager 208, the message is forwarded to the second communication manager 208 for call termination processing. The message is typically routed back to the second proxy server 228 with an indication that the termination processing has been performed. The proxy server 228 then routes the message to the called second communication device 220.

Call origination processing refers to any feature processing performed at the originating device's communication manager during setup of a call, including the application of call originating features, such as bridging, hold recall (a line appearance is re-alerted if it has been held longer than an administered time), transfer recall (a call transferred to another endpoint will return to the endpoint it was transferred from after the administered period of time), intercom (calling to specific numbers or intercom groups), call pickup (the ability to pick up calls ringing at other endpoints), line appearance reservation, call appearance lamp updates (e.g., lighting a lamp on a desk set, lighting bridged call appearances on the originator's communication device on other communication devices, and notification of other communication devices that have subscribed to the originator's dialog package (which thereby allows other communication devices to bridge onto an off-premises proxy server-originated call)), class of restriction (or administered call controls), call detail recording (e.g., call logging), one-touch recording on originated calls, access to feature name Universal Resource Indicators or URIs, use of an administered communication manager's dial plan for all calls, and the like.

Feature name URIs refer to a method for activating or deactivating a feature by sending a SIP INVITE message, or another suitable message in another protocol, to a defined URI. The communication manager maps the URI against a listing of feature names and then causes activation/deactivation of the mapped feature name corresponding to the received URI. Feature names include activate appearance select, automatic call-back cancel, call forward all, call forward busy/no answer, call forward cancel, call park, call park answer back, call pick-up, conference on answer, calling number block, calling number unblock, directed call pick-up, drop last added party, exclusion (toggle on/off), held appearance select, idle appearance select, last number dialed, malicious call trace, malicious call trace cancel, off-PBX call enable, off-PBX call disable, priority call, send all calls, send all calls cancel, transfer on hang-up, intercom, one-touch recording, and transfer to voice mail. For features requiring extra digits from the user, such as call-forwarding activation (which requires the forwarded-to-number), the digits may be sent as part of the user portion of the Request-URI or in-band after the audio session has been established.

The communication device can be made aware of the state of its feature by sending a SIP SUBSCRIBE message requesting updates on changes in its feature statuses. The corresponding home proxy server will proxy SUBSCRIBE to the communication manager on behalf of the communication device. When the state of any feature changes, the communication manager will send a SIP NOTIFY message with the current states of all features.

Call termination processing refers to any feature processing performed at the called device's communication manager during setup of a call, including the application of call terminating features, such as bridging, simultaneous ringing (parallel forking), call appearance lamp updates (e.g., lighting a lamp on a desk set, lighting bridged call appearances on the called party's communication device on other communication devices, distinctive alerting (to visibly and audibly indicate the difference between internal, external, and priority calls), display of connected party name/number, and notification of other communication devices that have subscribed to the called party's dialog package (which thereby allows other communication devices to bridge onto an off-premises proxy server-originated call)), class of restriction (or administered call controls), call detail recording (e.g., call logging), one-touch recording on received calls, use of an administered communication manager's dial plan for all calls, call coverage, call forwarding, hunt group, and the like.

The Operation of the Server Architecture of the Present Invention

Figure 3:
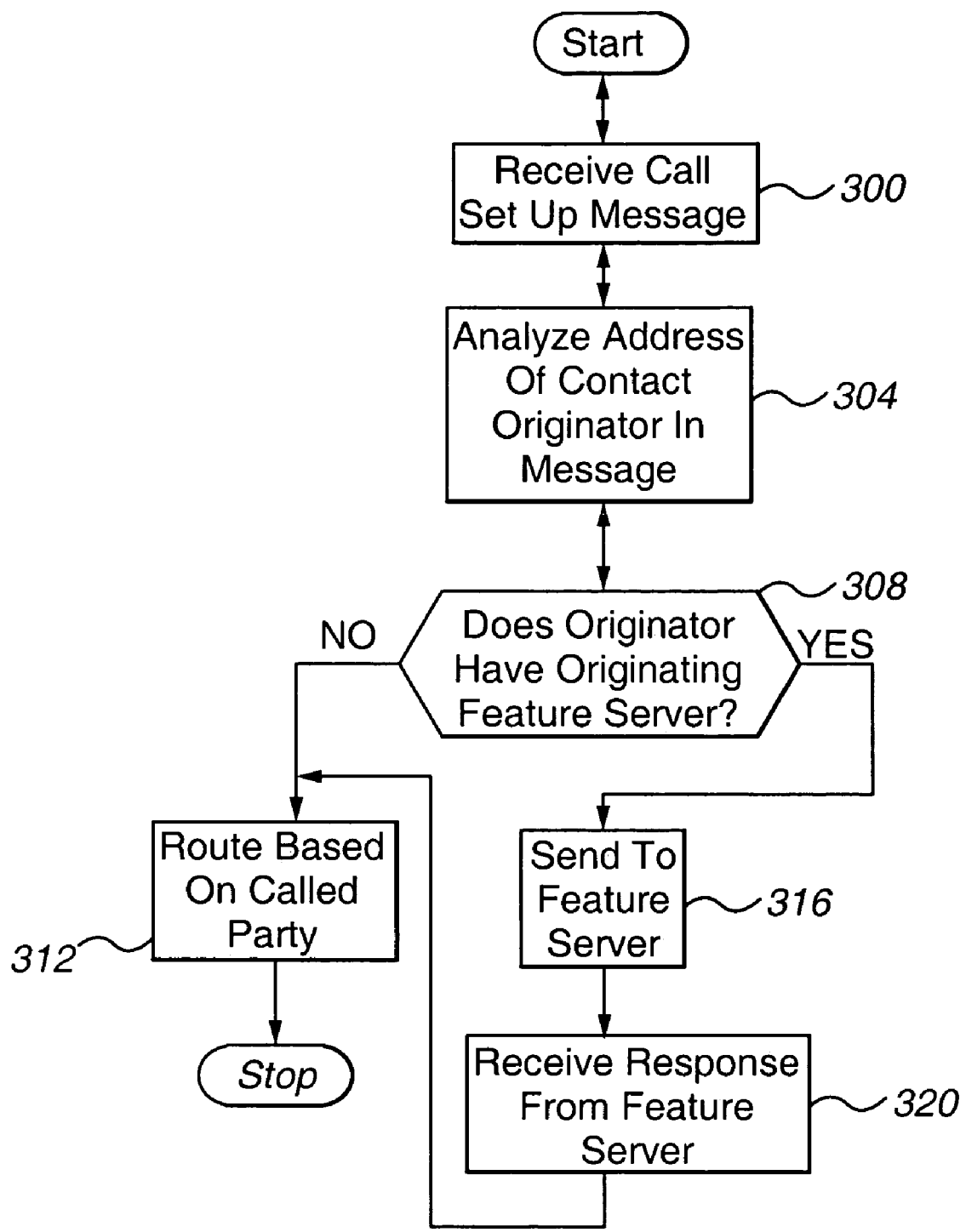
FIG. 3 is a flow chart of the operation of a proxy server according to an embodiment of the present invention.
Figure 4:
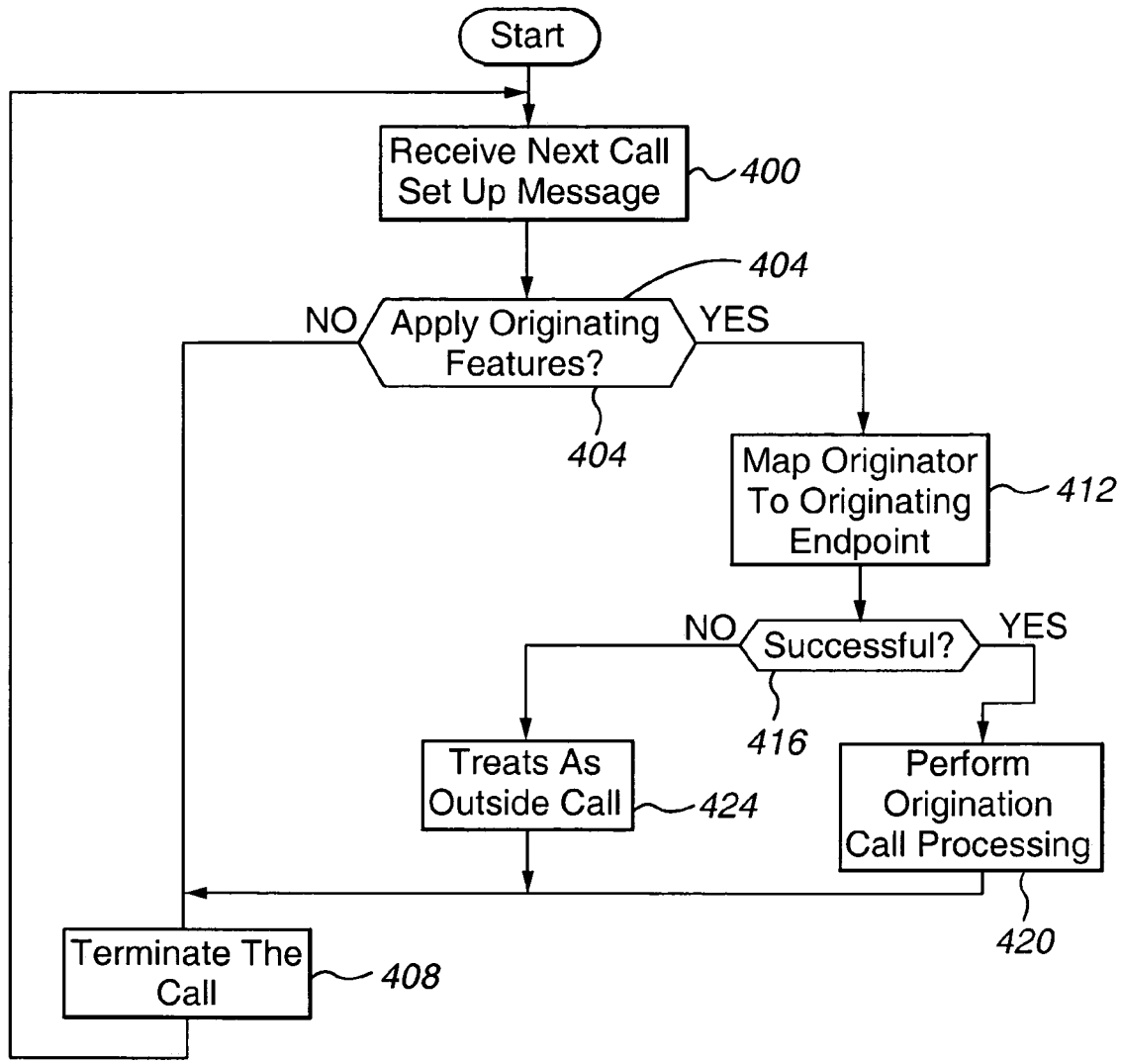
FIG. 4 is a flow chart of the operation of a communication manager according to an embodiment of the present invention.
Figure 5:
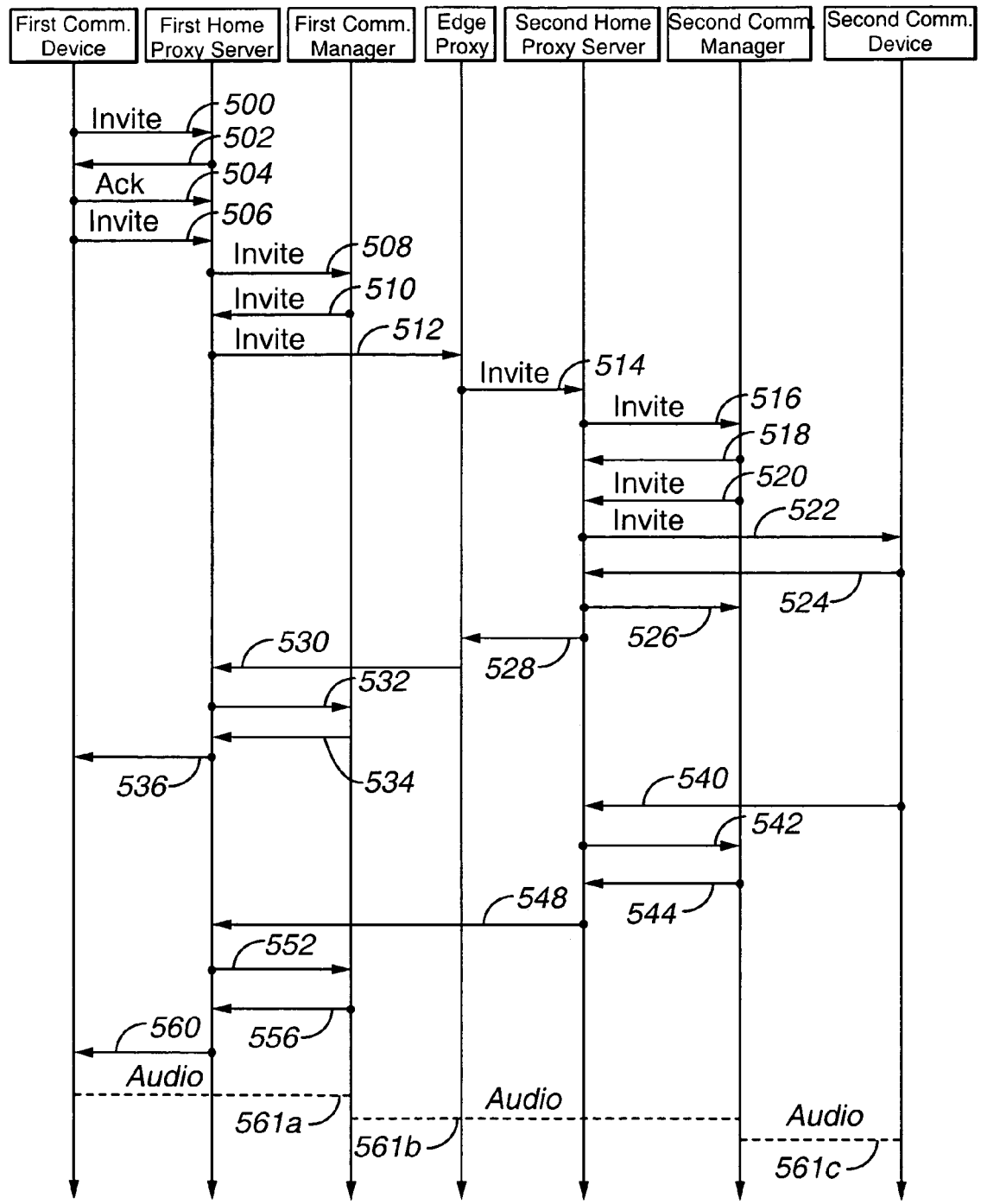
FIG. 5 is a call setup message flow according to an embodiment of the present invention.

The operation of the architecture 200 of the present invention will now be discussed with reference to FIGS. 3-5 and an example assuming that the first communication device 216 initiates a call to the second communication device 220. The example assumes that the second communication device 220 has registered successfully with the second home proxy server 228.

The first communication device initiates the call to the second communication device by sending a SIP INVITE message 500 to the first home proxy server 224. The first proxy server sends a challenge message 502 using an authentication realm. The first communication device responds with a SIP ACK message 504 and resends the INVITE message 506 with credentials. The resent INVITE message includes one or all of an original-identity header, and/or a preferred identity field.

In step 300, the first home proxy server 204 receives and authenticates successfully the message 506, and, in step 304, analyzes the address of the contact originator (or first communication device) to determine in decision diamond 308 if the first contact originator has a corresponding communication manager or feature server. To make this determination possible, each home proxy server has a table listing, for each user, each corresponding communication device and the respective administered extension on the communication manager and contact address (e.g., SIP address) of the device. If not, the call in step 312 is routed normally to the second communication device. If so, the message in step 316 is sent to the feature server. Because the first communication device is serviced by the first communication manager, the first proxy server inserts the asserted identity of the first communication device in canonical form into the INVITE message and forwards the INVITE message 508 to the first communication manager 204 indicating that originating processing is to be performed. This is typically indicated by inserting a message "phase=originating" into the route header of the INVITE message 508.

In step 400, the first communication manager 204 receives the INVITE message 508. The first communication manager examines the route header and determines in decision diamond 404 whether the first communication manager is to perform originating call processing. If the route header had not indicated that originating call processing was to be performed, the first communication manager would proceed immediately to step 408 (discussed below). Because the route header indicates that originating call processing is to be performed, the first communication manager in step 412 attempts to map the asserted identity of the first communication device against a set of administered extensions to identify the administered extension corresponding to the asserted identity. In decision diamond 416 when the mapping is not successful, the first communication manager in step 424 treats the call as an outside call and when the mapping is successful, the first communication manager in step 420 sets up the association with the first communication device and applies call origination processing. In the example, the call origination processing is assumed to be selecting a call appearance on the first communication device for a selected extension (e.g., call restriction and bridging indications for appearance of the selected extension is selected). When the destination in the INVITE message is numeric, the first communication manager passes the digits through the first communication manager dial plan to find the non-numeric URI of the destination. After performing call origination processing, the first communication manager in step 408 changes the phase from "originating" to "terminating" and returns the modified INVITE message 510 to the first home proxy server.

In step 320, the first home proxy server receives the INVITE message 510 from the first communication manager and determines that terminating processing is required and that the destination (or second communication device) is not local. The first proxy server, in step 312 routes the INVITE message 512 to the edge proxy server 232.

The edge proxy server pushes the INVITE message 514 to the second home proxy server 228. The agent 244b in the second home proxy server forwards the message to each "contact" listed for the destination (the second communication device). One of the contacts is the administered extension of the second communication device on the second communication manager. The agent 244b, in step 316 sends the INVITE message 516 to the second communication manager indicating that call terminating processing is to be performed.

The second communication manager performs steps 400, 404, 416, and 420 with reference to the destination rather than the originator and call terminating processing rather than call origination processing. The second communication manager generates a message 518 that includes an Session Description Protocol or SDP pointing to the media gateway (not shown) and starts ringback tone generation. The second communication manager also performs terminating processing by selecting a call appearance for the call and modifies the INVITE message 516 by modifying the route header to indicate that the next step is endpoint directing. The modified INVITE message 520 is returned to the second home proxy server, which forwards the INVITE message 522 to the second communication device.

The second communication device rings and sends an alerting or ringing message 524 to the second home proxy server indicating that the device state is "ringing." The second proxy server forwards the alerting message 524 to the second communication manager, which inserts the asserted identity of the first communication device including a display name, and forwards the alerting message 528 to the edge proxy server, which in turn forwards the alerting message 530 to the first home proxy server.

The first home proxy server forwards the alerting message 532 to the first communication manager. The first communication manager updates the SDP to show the media gateway local to the first communication device and cuts backward media through. The alerting message 534 is returned to the first home proxy server, which forwards the returned alerting message 536 to the first communication device. The first user of the first communication device hears a ring back tone and the first communication device displays the identity of the second communication device based on the second communication device's asserted identity or on the contact displayname.

When the second user answers the second communication device, additional call connect messages 540 (which includes the SDP), 542 (which includes the asserted identity of the second communication device including the display name), 544 (which modifies the SDP to point to the media gateway local to the second communication device), 548, 550, 552, 556 (which modifies the SDP to point to the media gateway local to the first communication device), and 560 are generated and exchanged to create a segmented audio channel (denoted by segments 561a-c) between the first communication device and the first communication manager, between the first communication manager and the second communication manager, and between the second communication manager and the second communication device.

A number of variations and modifications of the invention can be used. It would be possible to provide for some features of the invention without providing others.

For example in one alternative embodiment, the various components or modules can be implemented as hardware or software or a combination thereof and can be implemented in different ways. For example, the steps noted above for each module can be performed by other modules, depending on the application.

In another alternative embodiment, protocols other than those discussed above can be used with one or more of the above embodiments. For example, protocols that can be used in addition to or in lieu of SIP include H.323, Integrated Services Digital Network, ISDN, and analog caller ID. The request to perform call originating/processing, the phase indicator, and other pertinent information required to implement the present invention could be included in the message packet user information field.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for setting up a communication between first and second communication devices, the first communication device corresponding to a first directing server and first communication manager separate from the first directing server, comprising:

the first directing server receiving a call set up message at least one of addressed to and originated by the first communication device;

the first directing server determining that the first communication device has a corresponding first communication manager;

the first directing server forwarding the call set up message to the first communication manager and requesting the first communication manager to perform at least one of call originating and terminating processing, the call setup message including a message in a route header of an INVITE message, the route header specifying the at least one of call originating and terminating processing;

the first communication manager performing the at least one of call originating and terminating processing; and the first directing server directing the call set up message to a destination referenced in the call set up message.

2. The method of claim 1, wherein the call set up message is addressed to the first communication device from a second communication device and wherein the at least one of call originating and terminating processing is call terminating processing.

3. The method of claim 1, wherein the call set up message is originated by the first communication device and addressed to a second communication device;

wherein the at least one of call originating and terminating processing is call originating processing;

wherein the first communication device has an extension administered on the first communication manager; and wherein the extension of the first communication device is indexed against an identity of the first communication device.

4. The method of claim 3, wherein the determining step comprises mapping the identity to a set of administered extensions to identify the administered extension corresponding to the first communication device.

5. The method of claim 3, wherein the forwarding step comprises the substeps of:

inserting the identity of the first communication device in the call set up message; and including a first indicator in the call set up message, the indicator indicating that call originating processing is to be performed.

6. The method of claim 5, further comprising:

mapping the identity of the first communication device against a set of administered extensions to determine the administered extension for the first communication device; and when the mapping is successful, the performing step is performed by the first communication manager.

7. The method of claim 6, further comprising:

including a second indicator in a responsive message returned to the first directing server, wherein the indicator indicates that call terminating processing is to be performed.

8. The method of claim 7, wherein the second communication device corresponds to a second directing server and second communication manager separate from the first and second directing servers and further comprising:

the first directing server forwarding the call set up message to the second directing server, the call set up message including the second indicator;

the second directing server receiving the call set up message addressed to the second communication device;

the second directing server determining that the second communication device has a corresponding second communication manager;

the second directing server forwarding the call set up message to the second communication manager and requesting the second communication manager to perform call terminating processing;

the second communication manager performing the call terminating processing; and in response thereto, the second directing server directing the call set up message to the second communication device.

9. The method of claim 1, wherein the first directing server is a proxy server and the call setup message is an INVITE message as defined by the Session Initiation Protocol.

10. The method of claim 1, wherein the call set up message is originated by the first communication device and addressed to a second communication device;

wherein the at least one of call originating and terminating processing is call originating processing; and wherein the call originating processing comprises application of a call originating feature and wherein the call originating feature is at least one of bridging, hold recall, transfer recall, intercom, call pickup, line appearance reservation, call appearance lamp updates, class of restriction, call detail recording, one-touch recording on originated calls, access to feature name Universal Resource Indicators or URIs, and use of an administered communication manager's dial plan for all calls.

11. The method of claim 10, wherein the application is at least one of activation and deactivation of a feature defined by a feature name URI and wherein the feature name URI corresponds to at least one of the following: activate appearance select, automatic call-back cancel, call forward all, call forward busy/no answer, call forward cancel, call park, call park answer back, call pick-up, conference on answer, calling number block, calling number unblock, directed call pick-up, drop last added party, exclusion, held appearance select, idle appearance select, last number dialed, malicious call trace, malicious call trace cancel, off-PBX call enable, off-PBX call disable, priority call, send all calls, send all calls cancel, transfer on hang-up, intercom, one-touch recording, and transfer to voice mail.

12. A computer readable medium having stored thereon computer executable instructions operable to perform the steps of claim 1.

13. An architecture for setting up a communication between first and second communication devices, the first communication device corresponding to a first directing server and first communication manager separate from the first directing server, comprising:

a contact servicing agent operable to (a) receive a call set up message at least one of addressed to and originated by the first communication device; (b) determine that the first communication device has a corresponding first communication manager; (c) forward the call set up message to the first communication manager and request the first communication manager to perform at least one of call originating and terminating processing, the call setup message including a message in a route header of an INVITE message, the route header specifying the at least one of call originating and terminating processing; and (d) rout the call set up message to a destination referenced in the call set up message.

14. The architecture of claim 13, wherein the call set up message is addressed to the first communication device from a second communication device and wherein the at least one of call originating and terminating processing is call terminating processing and wherein the agent is in the first directing server.

15. The architecture of claim 13, wherein the call set up message is originated by the first communication device and addressed to a second communication device;

wherein the at least one of call originating and terminating processing is call originating processing;

wherein the first communication device has an extension administered on the first communication manager;

wherein the extension of the first communication device is indexed against an identity of the first communication device; and wherein the agent is in the first directing server.

16. The architecture of claim 15, wherein the determining operation comprises mapping the identity to a set of administered extensions to identify the administered extension corresponding to the first communication device.

17. The architecture of claim 15, wherein the forwarding operation comprises the operations of inserting the identity of the first communication device in the call set up message; and including a first indicator in the call set up message, the indicator indicating that call originating processing is to be performed.

18. The architecture of claim 17, wherein the first communication manager is operable to map the identity of the first communication device against a set of administered extensions to determine the administered extension for the first communication device; and when the mapping is successful, perform call originating processing.

19. The architecture of claim 18, wherein the first communication manager is operable to include a second indicator in a responsive message returned to the first directing server, wherein the indicator indicates that call terminating processing is to be performed.

20. The architecture of claim 19, wherein the second communication device corresponds to a second directing server and second communication manager separate from the first and second directing servers; wherein the first directing server is operable to forward the call set up message to the second directing server, the call set up message including the second indicator and wherein a contact servicing agent in the second directing server is operable to (a) receive the call set up message addressed to the second communication device; (b) determine that the second communication device has a corresponding second communication manager; (c) forward the call set up message to the second communication manager and requesting the second communication manager to perform call terminating processing; and (d) rout the call set up message to the second communication device.

21. The architecture of claim 13, wherein the first directing server is a proxy server and the call setup message is an INVITE message as defined by the Session Initiation Protocol.

22. The architecture of claim 13, wherein the call set up message is originated by the first communication device and addressed to a second communication device;

wherein the at least one of call originating and terminating processing is call originating processing; and wherein the call originating processing comprises application of a call originating feature and wherein the call originating feature is at least one of bridging, hold recall, transfer recall, intercom, call pickup, line appearance reservation, call appearance lamp updates, class of restriction, call detail recording, one-touch recording on originated calls, access to feature name Universal Resource Indicators or URIs, and use of an administered communication manager's dial plan for all calls.

23. The architecture of claim 22, wherein the application is at least one of activation and deactivation of a feature defined by a feature name URI and wherein the feature name URI corresponds to at least one of the following: activate appearance select, automatic call-back cancel, call forward all, call forward busy/no answer, call forward cancel, call park, call park answer back, call pick-up, conference on answer, calling number block, calling number unblock, directed call pick-up, drop last added party, exclusion, held appearance select, idle appearance select, last number dialed, malicious call trace, malicious call trace cancel, off-PBX call enable, off-PBX call disable, priority call, send all calls, send all calls cancel, transfer on hang-up, intercom, one-touch recording, and transfer to voice mail.

* * * * *